(12) United States Patent
Huang et al.

(10) Patent No.: US 11,006,333 B2
(45) Date of Patent: May 11, 2021

(54) METHOD AND APPARATUS FOR CELL RESELECTION

(71) Applicant: CLOUDMINDS (SHANGHAI) ROBOTICS CO., LTD., Shanghai (CN)

(72) Inventors: William Xiao-Qing Huang, Shenzhen (CN); Haitao Jiang, Shenzhen (CN); Zhenkai Wang, Shenzhen (CN)

(73) Assignee: CLOUDMINDS (SHANGHAI) ROBOTICS CO., LTD., Shanghai (CN)

( * ) Notice: Subject to any disclaimer, the term of this patent is extended or adjusted under 35 U.S.C. 154(b) by 136 days.

(21) Appl. No.: 16/556,306

(22) Filed: Aug. 30, 2019

(65) Prior Publication Data

US 2019/0387443 A1  Dec. 19, 2019

Related U.S. Application Data

(63) Continuation of application No. PCT/CN2017/081498, filed on Apr. 21, 2017.

(51) Int. Cl.
*H04W 36/00* (2009.01)
*H04W 36/08* (2009.01)
(Continued)

(52) U.S. Cl.
CPC ... *H04W 36/0094* (2013.01); *H04W 36/0061* (2013.01); *H04W 36/08* (2013.01); *H04W 36/32* (2013.01); *H04W 52/22* (2013.01)

(58) Field of Classification Search
CPC .... H04B 1/7075; H04B 17/21; H04B 17/318; H04B 17/327; H04B 17/382;
(Continued)

(56) References Cited

U.S. PATENT DOCUMENTS 8,457,038 B1 * 6/2013 Xue ................. H04W 36/0085
370/318
9,137,757 B2 * 9/2015 Lee ................... H04W 52/146
(Continued)

FOREIGN PATENT DOCUMENTS

CN       101442786 A    5/2009
CN       101577950 A   11/2009
(Continued)

OTHER PUBLICATIONS

Translation of Cloudminds (Shenzen) Robotics Systems Co., Ltd., First Office Action of CN201780001928.3, published Sep. 24, 2019, pp. 3-4 (Year: 2019).*

(Continued)

*Primary Examiner* — Thomas R Cairns
(74) *Attorney, Agent, or Firm* — Morgan, Lewis & Bockius LLP (57) ABSTRACT

The present disclosure provides a method and an apparatus for cell reselection. The method includes: receiving threshold information for enabling cell reselection measurement sent by a network side device, where the threshold information for enabling cell reselection measurement includes at least one power threshold for enabling cell reselection measurement and corresponding preset speed range information, the preset speed range information being used to indicate a movement speed range of a preset terminal; obtaining a movement speed of the terminal and a first received power measurement value of a downlink reference signal received by the terminal in a cell to be camped on; and determining, according to the movement speed, the threshold information for enabling cell reselection measurement, and the first received power measurement value, whether to enable the cell reselection measurement.

17 Claims, 6 Drawing Sheets

(51) Int. Cl.
*H04W 36/32* (2009.01)
*H04W 52/22* (2009.01)

(58) Field of Classification Search
CPC . H04W 28/16; H04W 36/00; H04W 36/0061; H04W 36/0083; H04W 36/00835–0094; H04W 36/08; H04W 36/30; H04W 36/305; H04W 36/32; H04W 48/00; H04W 48/16; H04W 48/20; H04W 52/0251; H04W 52/0254–0258; H04W 52/22; H04W 52/221–228; H04W 72/00
See application file for complete search history.

(56) References Cited

U.S. PATENT DOCUMENTS

| | | |
|---|---|---|
| 2009/0291688 A1 | 11/2009 | Uehara et al. |
| 2014/0177607 A1 | 6/2014 | Li et al. |
| 2014/0213259 A1* | 7/2014 | Teyeb ............... H04W 36/0094 455/436 |
| 2015/0208314 A1* | 7/2015 | Lorca Hernando ... H04W 36/32 455/441 |
| 2015/0208353 A1* | 7/2015 | Jung ................. H04W 52/0254 455/456.6 |
| 2019/0007872 A1* | 1/2019 | Sundberg ............ H04B 17/104 |
| 2019/0174382 A1* | 6/2019 | Yu ........................ H04W 76/27 |
| 2019/0357112 A1* | 11/2019 | Shen .................... H04W 36/30 |

FOREIGN PATENT DOCUMENTS

| | | |
|---|---|---|
| CN | 101998555 A | 3/2011 |
| CN | 102547881 A | 7/2012 |
| CN | 103581885 A | 2/2014 |
| CN | 105050141 A | 11/2015 |
| CN | 105338578 A | 2/2016 |
| WO | WO 2013/104176 A1 | 7/2013 |
| WO | WO 2014/054986 A1 | 4/2014 |

OTHER PUBLICATIONS

Cloudminds (Shenzhen) Robotics Systems Co., LTD., First Office Action, CN201780001928.3, dated Sep. 24, 2019, 7 pgs.

* cited by examiner

METHOD AND APPARATUS FOR CELL RESELECTION

CROSS-REFERENCE TO RELATED APPLICATIONS

The application is a continuation application of PCT application No. PCT/CN2017/081498 submitted on Apr. 21, 2017, which is incorporated herein by reference in its entirety.

TECHNICAL FIELD

The present disclosure relates to the communication field, and in particular, to a method and an apparatus for cell reselection.

BACKGROUND

With the development of the Internet of Things, cellular technologies of the Internet of Things represented by the cell-based Narrow Band Internet of Things (NB-IoT) become an important means for implementing the Internet of Everything. A basic standard of the NB-IoT has been completed in the 3rd Generation Partnership Project (3GPP).

When cell reselection measurement is performed on an NB-IoT terminal and when a received power value of a downlink reference signal of an idle NB-IoT terminal in a neighboring cell is less than a set threshold power for enabling the cell reselection measurement, cell reselection is determined. However, because the power threshold for enabling the cell reselection measurement by the idle NB-IoT terminal is still a power threshold of LTE for enabling cell reselection measurement, and because the power threshold for enabling cell reselection measurement of the LTE is relatively small, the NB-IoT terminal may be far away from a cell to be camped on. In addition, when the NB-IoT terminal enters a coverage area of the neighboring cell (that is, the received power of the NB-IoT terminal for the downlink reference signal in the neighboring cell has far exceeded a received power value of a downlink reference signal in the cell to be camped on), the NB-IoT terminal still cannot be reselected for the neighboring cell. In this case, when the terminal initiates a service (including initiates paging in the cell to be camped on when the terminal initiates a service request in the cell to be camped on and when a downlink service of the terminal arrives at the network side), it cannot be ensured that the terminal operates in an optimum cell.

With regard to the foregoing problem, in an existing method, the foregoing power threshold for enabling cell reselection measurement is increased, so that the terminal enables the cell reselection earlier. However, an increase in the threshold power for enabling cell reselection measurement results in frequent cell reselection measurement by some terminals (such as the NB-IoT terminal with a relatively low speed or in a static state) that do not need to perform cell reselection, thereby increasing power consumption of the terminals.

SUMMARY

In order to resolve the foregoing problem, the present disclosure provides a method and an apparatus for cell reselection.

In a first aspect, a method for cell reselection is provided, including: receiving threshold information for enabling cell reselection measurement sent by a network side device, the threshold information for enabling cell reselection measurement including at least one power threshold for enabling cell reselection measurement and corresponding preset speed range information, the preset speed range information being used to indicate a movement speed range of a preset terminal; obtaining a movement speed of the terminal and a first received power measurement value of a downlink reference signal received by the terminal in a cell to be camped on; and determining, according to the movement speed, the threshold information for enabling cell reselection measurement, and the first received power measurement value, whether to enable the cell reselection measurement.

In a second aspect, a method for cell reselection is provided, including: determining threshold information for enabling cell reselection measurement, the threshold information for enabling cell reselection measurement including at least one power threshold for enabling cell reselection measurement and corresponding preset speed range information, and the preset speed range information being used to indicate a movement speed range of a preset terminal; sending threshold information for enabling cell reselection measurement to a terminal, so that the terminal determines, according to the movement speed and the threshold information for enabling cell reselection measurement, whether to enable the cell reselection measurement.

In a third aspect, an apparatus for cell reselection is provided, including: a receiving module, configured to receive threshold information for enabling cell reselection measurement sent by a network side device, the threshold information for enabling cell reselection measurement including at least one power threshold for enabling cell reselection measurement and corresponding preset speed range information, the preset speed range information being used to indicate a movement speed range of a preset terminal; a first obtaining module, configured to obtain a movement speed of the terminal and a first received power measurement value of a downlink reference signal received by the terminal in a cell to be camped on; and a reselecting module, configured to determine, according to the movement speed, the threshold information for enabling cell reselection measurement, and the first received power measurement value, whether to enable the cell reselection measurement.

In a fourth aspect, an apparatus for cell reselection is provided, including: a determining module, configured to determine threshold information for enabling cell reselection measurement, the threshold information for enabling cell reselection measurement including at least one power threshold for enabling cell reselection measurement and corresponding preset speed range information, the preset speed range information being used to indicate a movement speed range of a preset terminal; a first sending module, configured to send the threshold information for enabling cell reselection measurement to a terminal, so that the terminal determines, according to the movement speed and the threshold information for enabling cell reselection measurement, whether to enable the cell reselection measurement.

In a fifth aspect, a non-transitory computer readable storage medium is provided. The non-transitory computer readable storage medium includes one or more programs for performing the method described in the foregoing first aspect.

In a sixth aspect, a terminal is provided. The terminal includes: the non-transitory computer readable storage medium described in the foregoing fifth aspect; and one or more processors for executing programs in the non-transitory computer readable storage medium.

In a seventh aspect, a non-transitory computer readable storage medium is provided. The non-transitory computer readable storage medium includes one or more programs for performing the method described in the foregoing second aspect.

In an eighth aspect, a network side device is provided. The network side device includes: the non-transitory computer readable storage medium described in the foregoing seventh aspect; and one or more processors for executing programs in the non-transitory computer readable storage medium.

In the foregoing technical solutions, the terminal receives the threshold information for enabling cell reselection measurement sent by the network side device, the threshold information for enabling cell reselection measurement including at least one power threshold for enabling cell reselection measurement and corresponding preset speed range information, and the preset speed range information being used to indicate the movement speed range of the preset terminal; obtains the movement speed of the terminal and the first received power measurement value of the downlink reference signal received by the terminal in a cell to be camped on; and determines, according to the movement speed, the threshold information for enabling cell reselection measurement, and the first received power measurement value, whether to enable the cell reselection measurement. In this way, the terminal may determine a target power threshold according to the movement speed of the terminal and the threshold information for enabling cell reselection measurement sent by the network side device, so that it can be flexibly determined, according to the target power threshold corresponding to the movement speed, whether to perform cell reselection measurement, and the NB-IoT terminal with a low speed or in a static state is prevented from frequently enabling the cell reselection measurement, thereby reducing power consumption of the terminal.

DETAILED DESCRIPTION

Specific implementations of this disclosure are described in detail below with reference to the accompanying drawings. It should be understood that the specific implementations described herein are merely used to describe and explain this disclosure rather than limiting this disclosure.

The technical solutions provided in the following embodiments of the present disclosure may be applied to an NB-IoT system. The system may include a network side device and a terminal, and the network side device may be a base station (BS). The base station is a device that communicates with the terminal, which may provide communication coverage of a specific physical area. For example, the base station may be specifically an evolutional node B (ENB or eNodeB for short) in LTE, or may be other access network devices providing an access service in a wireless communication network.

The terminal may be distributed in an entire mobile communication system, and each terminal may be static or mobile. For example, the terminal may be a wireless communication device such as a mobile station, a subscriber unit, a station, and may further be a cellular phone, a personal digital assistant (PDA), a handheld device, or a laptop computer.

The present disclosure provides a method and an apparatus for cell reselection. The terminal may determine a target power threshold according to a movement speed of the terminal and threshold information for enabling cell reselection measurement sent by the network side device, so that it can be flexibly determined, according to the target power threshold corresponding to the movement speed and an obtained first received power measurement value of a downlink reference signal in a cell to be camped on, whether to perform cell reselection, and the NB-IoT terminal with a low speed or in a static state is prevented from frequently enabling the cell reselection measurement when the power threshold for enabling cell reselection is set to an excessively large value in the prior art, thereby reducing power consumption of the terminal.

The present disclosure is described in detail below with reference to specific embodiments.

Figure 1:
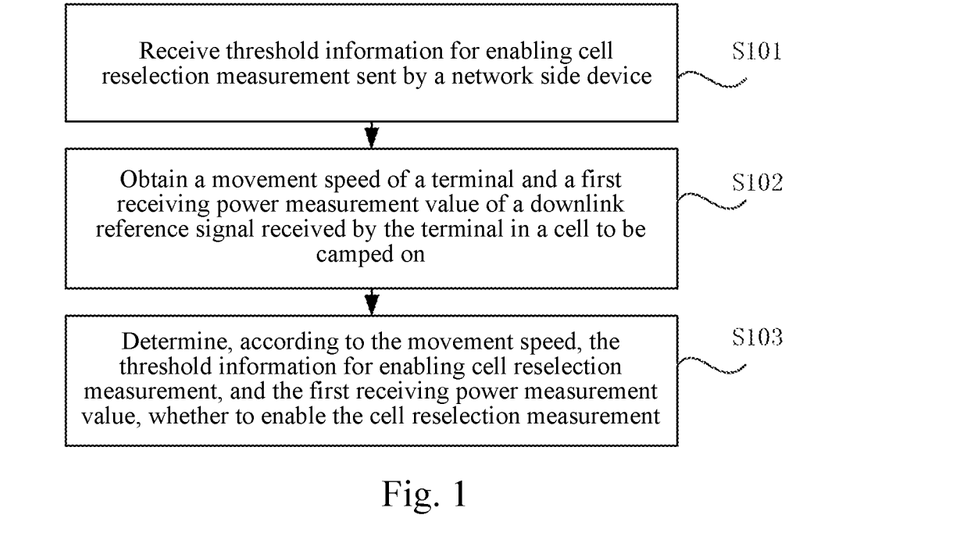
FIG. 1 is a schematic flowchart of a method for cell reselection according to an embodiment of the present disclosure.

FIG. 1 shows a method for cell reselection according to an embodiment of the present disclosure. As shown in FIG. 1, the method is applied to a terminal, including:

S101. Threshold information for enabling cell reselection measurement sent by a network side device is received.

The threshold information for enabling cell reselection measurement includes at least one power threshold for enabling cell reselection measurement and corresponding preset speed range information, the preset speed range information being used to indicate a movement speed range of a preset terminal.

In this step, the preset speed range information may be represented using a preset speed level, and different preset speed ranges correspond to different preset speed levels. In addition, each power threshold for enabling cell reselection measurement corresponds to one preset speed level, the preset speed level directly corresponding to a speed range or corresponding to a number of cells on which the terminal camps within preset time.

S102. A movement speed of a terminal and a first received power measurement value of a downlink reference signal received by the terminal in a cell to be camped on is obtained.

In this step, the movement speed of the terminal may be obtained using a positioning module of the terminal, the positioning module being a Global Positioning System (GPS) positioning module, and the like, which is not limited in the present disclosure.

S103. It is determined, according to the movement speed, the threshold information for enabling cell reselection measurement, and the first received power value measurement value, whether to enable the cell reselection measurement.

In the foregoing solutions, the terminal may determine a target power threshold according to the movement speed of the terminal and the threshold information for enabling cell reselection measurement sent by the network side device, so that it can be flexibly determined, according to the power threshold for enabling cell reselection measurement corresponding to the movement speed, whether to perform cell reselection measurement, and the NB-IoT terminal with a low speed or in a static state is prevented from frequently enabling the cell reselection measurement, thereby reducing power consumption of the terminal.

Figure 2:
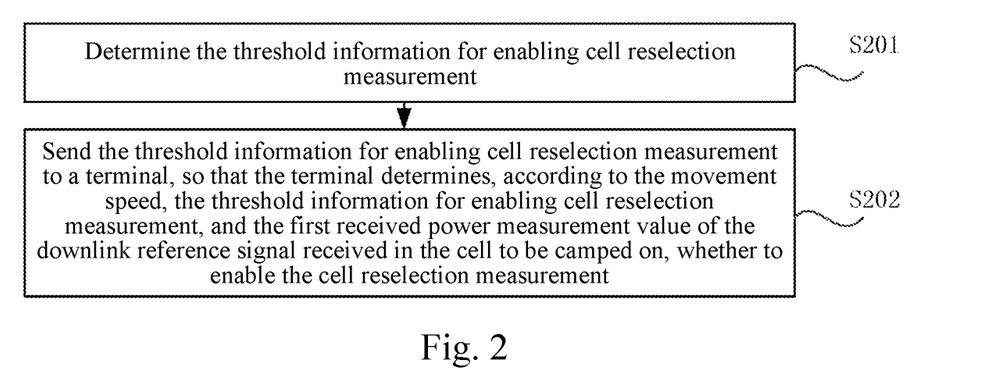
FIG. 2 is a schematic flowchart of another method for cell reselection according to an embodiment of the present disclosure.

FIG. 2 shows a method for cell reselection according to an embodiment of the present disclosure. As shown in FIG. 2, the method is applied to a network side device, including:

S201. Threshold information for enabling cell reselection measurement is determined.

The threshold information for enabling cell reselection measurement includes at least one power threshold for enabling cell reselection measurement and corresponding preset speed range information, the preset speed range information being used to indicate a movement speed range of a preset terminal.

In this step, the preset speed range information may be represented using a preset speed level, and different preset speed ranges correspond to different preset speed levels. In addition, each power threshold for enabling cell reselection measurement corresponds to one preset speed level, the preset speed level directly corresponding to a speed range or corresponding to a number of cells on which the terminal camps within preset time.

S202. The threshold information for enabling cell reselection measurement is sent to the terminal, so that the terminal determines, according to a movement speed, the threshold information for enabling cell reselection measurement, and a first received power measurement value of a downlink reference signal received in a cell to be camped on, whether to enable the cell reselection measurement.

In the foregoing solutions, the network side device may send configured threshold information for enabling cell reselection measurement to the terminal, and the terminal may determine a target power threshold according to its movement speed and the threshold information for enabling cell reselection measurement, so that a power threshold is flexibly selected to perform cell reselection measurement, and an NB-IoT terminal with a low speed or in a static state is prevented from frequently enabling cell reselection measurement, thereby reducing power consumption of the terminal.

Figure 3:
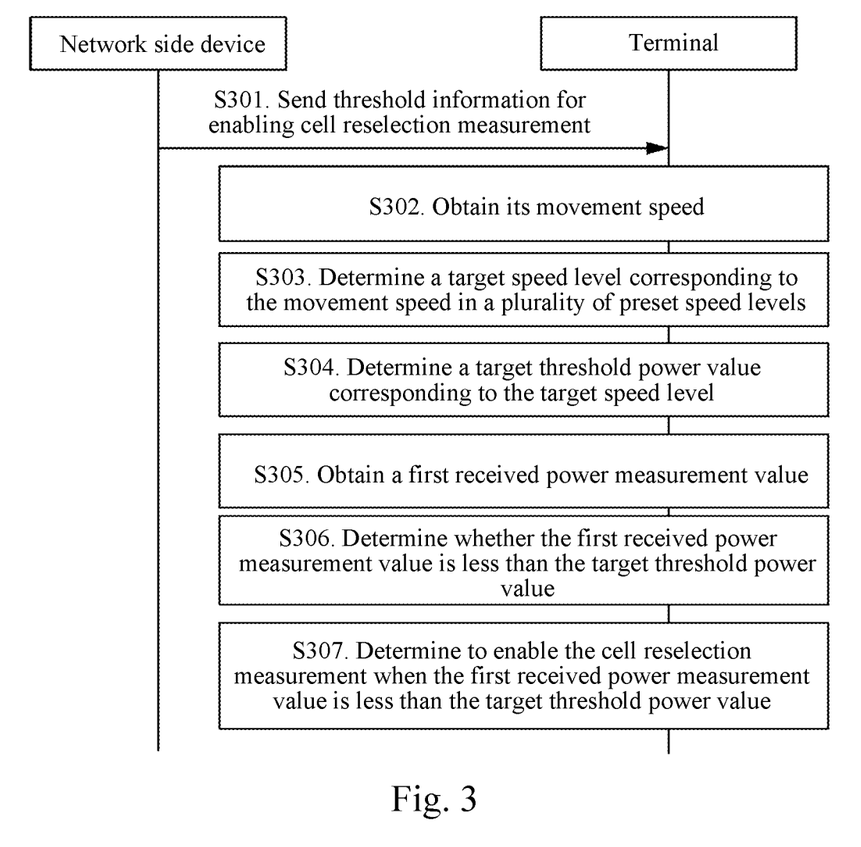
FIG. 3 is a schematic flowchart of a third method for cell reselection according to an embodiment of the present disclosure.

FIG. 3 shows a method for cell reselection according to an embodiment of the present disclosure. As shown in FIG. 3, in this embodiment, the threshold information for enabling cell reselection measurement configured by a network side device includes a plurality of power thresholds for enabling cell reselection measurements. The method includes:

S301. The network side device sends threshold information for enabling cell reselection measurement to a terminal after determining the threshold information for enabling cell reselection measurement.

The threshold information for enabling cell reselection measurement includes a plurality of power thresholds for enabling cell reselection measurement and corresponding preset speed range information, the preset speed range information being used to indicate a movement speed range of a preset terminal.

In this step, the preset speed range information may be represented using a preset speed level, and different preset speed ranges correspond to different preset speed levels. In addition, each power threshold for enabling cell reselection measurement corresponds to one preset speed level, the preset speed level directly corresponding to a speed range or corresponding to a number of cells on which the terminal camps within preset time.

S302. The terminal obtains its own movement speed.

In this step, the movement speed of the terminal may be obtained using a positioning module of the terminal, the positioning module being a Global Positioning System (GPS) positioning module, and the like, which is not limited in the present disclosure.

S303. The terminal determines a target speed level corresponding to the movement speed in a plurality of preset speed levels.

In this step, the target speed level may be determined in any of the following three manners.

Manner I: The terminal receives movement speed threshold values that are sent by the network side device and correspond to the plurality of preset speed levels, determines a target speed threshold value from the movement speed threshold values, and determines the target speed level according to the target speed threshold value.

Different movement speed threshold values correspond to different preset speed levels. The target speed threshold value is a minimum threshold value of the movement speed threshold values greater than the movement speed, or the target speed threshold value is a maximum threshold value of the movement speed threshold values less than the movement speed.

For example, the preset speed levels include five speed levels, which are respectively denoted as level 1, level 2, level 3, level 4, and level 5, and correspond to four threshold values, which are denoted as threshold value 1, threshold value 2, threshold value 3, and threshold value 4. The threshold value 1 is a threshold value for dividing the level 1 and the level 2, the threshold value 2 is a threshold value for dividing the level 2 and the level 3, the threshold value 3 is a threshold value for dividing the level 3 and the level 4, and the threshold value 4 is a threshold value for dividing the level 4 and the level 5. For the target speed threshold value being the minimum threshold value of the movement speed threshold values greater than the movement speed, a low level corresponding to the target speed threshold value may be used as the target speed level, such as the level 1 being a low level in the level 1 and the level 2, the level 2 being a low level in the level 2 and the level 3, and so on. For example, if the threshold value 1<the threshold value 2<the threshold value 3<the threshold value 4, when all the movement speeds are less than the foregoing four threshold values, the threshold value 1 is determined as the target speed threshold value, and the target speed level is level 1.

When the movement speed is greater than the threshold value 1 and less than the threshold value 2, the threshold value 2 is determined as the target speed threshold value, and the target speed level is level 2. It should be noted that the target speed level is level 5 when all the movement speeds are greater than the foregoing four threshold values.

For the target speed threshold value being the maximum threshold value of the movement speed threshold values less than the movement speed, a high level corresponding to the target speed threshold value may be used as a target speed level, such as the level 2 being a high level in the level 1 and the level 2, the level 3 being a high level in the level 2 and the level 3, and so on. For example, if the threshold value 1<the threshold value 2<the threshold value 3<the threshold value 4, when all the movement speeds are greater than the foregoing four threshold values, the threshold value 4 is determined as the target speed threshold value, and the target speed level is level 5. When the movement speed is greater than the threshold value 3 and less than the threshold value 4, the threshold value 3 is determined as the target speed threshold value, and the target speed level is level 4. It should be noted that the target speed level is level 1 when all the movement speeds are less than the foregoing four threshold values.

Manner II: Because the preset speed level represents a speed range of the movement speed, the terminal may determine a speed range corresponding to which preset speed level within which the movement speed of the terminal falls, thereby determining that the preset speed level corresponding to the speed range is the target speed level.

It should be noted that, in Manner I, the terminal does not learn the speed level defined by the network side device, and the preset speed level defined by the network side device can only be determined using the movement speed threshold value sent by the network side device. In Manner II, both the network side device and the terminal learn the preset speed level, in this way, the terminal may determine which preset speed level corresponding to the terminal according to its speed without requiring the network side device to send the movement speed threshold value.

Manner III: The terminal obtains a number of cells on which the terminal camps within a first preset time period, determines a target number threshold value from threshold values of the number of cells to be camped on, and determines the target speed level according to the target number threshold value. Different threshold values of the number of cells to be camped on correspond to different preset speed levels. The target number threshold value is a minimum threshold value of the target number threshold values greater than the number of cells, or the target number threshold value is a maximum threshold value of the target number threshold values less than the number of cells.

It should be noted that the target number threshold value is determined from the threshold values of the number of cells to be camped on, and the target speed level is determined according to the target number threshold value. For the foregoing descriptions, reference may be made to the foregoing Manner I in which the target speed threshold value is determined from the movement speed threshold values, and the target speed level is determined according to the target speed threshold value, and details are not described herein again.

S304. The terminal determines a target power threshold corresponding to the target speed level from the power threshold for enabling cell reselection measurement.

S305. The terminal obtains a first received power measurement value of a downlink reference signal received in the cell to be camped on.

S306. The terminal determines whether the first received power measurement value is less than the target power threshold.

S307. The terminal determines to enable the cell reselection measurement when the first received power measurement value is less than the target power threshold.

It should be noted that, an excessively high target power threshold may result in frequent cell reselection performed by the terminal. In order to resolve the problem, in another embodiment of the present disclosure, after enabling cell reselection measurement is determined, the terminal may further obtain a second received power measurement value of a downlink reference signal received by the terminal in a neighboring cell of the cell to be camped on, determines whether the second received power measurement values in all neighboring cell are less than the first received power measurement value within a second preset time period, stops cell reselection measurement when the second received power measurement values in all the neighboring cell are less than the first received power measurement value within the second preset time period, subtracts a preset corrected power value from the target power threshold to get a new target power threshold, uses the new target power threshold as the power threshold for enabling cell reselection measurement corresponding to the target speed level, re-obtains the movement speed and the first received power measurement value of the terminal, and determines, according to the re-obtained movement speed, the re-obtained first received power measurement value, and the new target power threshold, whether to re-enable the cell reselection measurement.

In this way, when it is determined, according to the first received power measurement value and the second received power measurement value, that cell reselection does not need to be performed for the cell to be camped on, the target power threshold may be reduced, and a frequency of enabling the cell reselection measurement may be reduced.

Accordingly, when the second received power measurement value in the target cell is less than the first received power measurement value within the second preset time period, the target cell is determined as a cell to be camped on of the terminal.

The target cell is any neighboring cell of all the neighboring cells.

In the foregoing solutions, the terminal may determine a target power threshold according to the movement speed of the terminal and the threshold information for enabling cell reselection measurement sent by the network side device, so that it can be flexibly determined, according to the power threshold for enabling cell reselection measurement corresponding to the movement speed, whether to perform cell reselection measurement, and the NB-IoT terminal with a low speed or in a static state is prevented from frequently enabling the cell reselection measurement, thereby reducing power consumption of the terminal.

It should be noted that, for brevity of description, the foregoing method embodiments are described as a series of movement combinations. However, a person skilled in the art should understand that the present disclosure is not limited by the movement sequence. In addition, a person skilled in the art should also understand that the embodiments described in this specification all belong to exemplary embodiments, and the involved actions and modules are not necessarily mandatory to the present disclosure.

Figure 4:
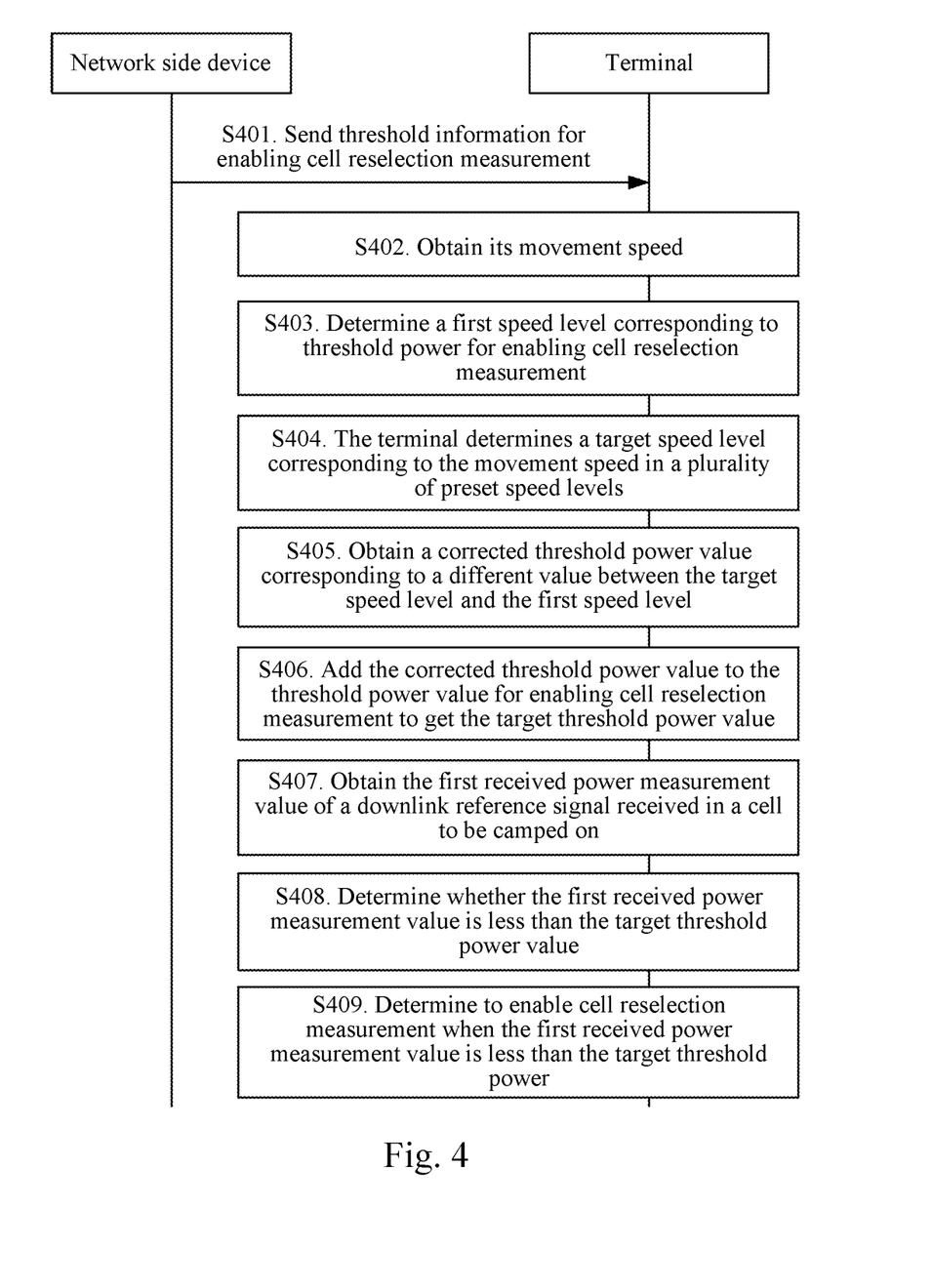
FIG. 4 is a schematic flowchart of a fourth method for cell reselection according to an embodiment of the present disclosure.

FIG. 4 is a method for cell reselection according to an embodiment of the present disclosure. As shown in FIG. 4, in this embodiment, threshold information for enabling cell reselection measurement configured by a network side device includes one power threshold for enabling cell reselection measurement. The method includes:

S401. The network side device sends threshold information for enabling cell reselection measurement to a terminal after determining the threshold information for enabling cell reselection measurement.

The threshold information for enabling cell reselection measurement includes one power threshold for enabling cell reselection measurement and a corresponding preset speed level, the preset speed range information being used to indicate a movement speed range of a preset terminal.

In this step, the preset speed range information may be represented using a preset speed level, and different preset speed ranges correspond to different preset speed levels. In addition, each power threshold for enabling cell reselection measurement corresponds to one preset speed level, the preset speed level directly corresponding to a speed range or corresponding to a number of cells on which the terminal camps within preset time.

It should be noted that the preset speed level may be classified into a low speed level, a medium speed level, and a high speed level according to a magnitude of a corresponding speed. The low speed level is a speed level corresponding to a relatively low speed, the medium speed level is a speed level corresponding to a medium speed, and the high speed level is a speed level corresponding to a relatively high speed. A speed range of the low speed level, the medium speed level, and the high speed may be specifically determined in detail according to network demands. When one power threshold for enabling cell reselection measurement in the foregoing threshold information for enabling reselection measurement is configured, which kind of terminal with a higher proportion in a current cell in an actual application scenario may be considered, and then the power threshold for enabling cell reselection measurement corresponding to any speed level in the category corresponding to the terminal with a highest proportion is configured as the power threshold for enabling cell reselection measurement sent to the terminal.

S402. The terminal obtains its own movement speed.

In this step, the movement speed of the terminal may be obtained using a positioning module of the terminal, the positioning module being a GPS (Global Positioning System) positioning module, and the like, which is not limited in the present disclosure.

S403. The terminal determines a first speed level corresponding to the power threshold for enabling cell reselection measurement.

S404. The terminal determines a target speed level corresponding to the movement speed in a plurality of preset speed levels.

In this step, the target speed level may be determined in any of the following three manners.

Manner I: The terminal receives movement speed threshold values that are sent by the network side device and correspond to the plurality of preset speed levels, determines a target speed threshold value from the movement speed threshold values, and determines the target speed level according to the target speed threshold value.

Different movement speed threshold values correspond to different preset speed levels. The target speed threshold value is a minimum threshold value of the movement speed threshold values greater than the movement speed, or the target speed threshold value is a maximum threshold value of the movement speed threshold values less than the movement speed.

For example, the preset speed levels include five speed levels, which are respectively denoted as level 1, level 2, level 3, level 4, and level 5, and correspond to four threshold values, which are denoted as threshold value 1, threshold value 2, threshold value 3, and threshold value 4. The threshold value 1 is a threshold value for dividing the level 1 and the level 2, the threshold value 2 is a threshold value for dividing the level 2 and the level 3, the threshold value 3 is a threshold value for dividing the level 3 and the level 4, and the threshold value 4 is a threshold value for dividing the level 4 and the level 5. For the target speed threshold value being the minimum threshold value of the movement speed threshold values greater than the movement speed, a low level corresponding to the target speed threshold value may be used as the target speed level, such as the level 1 being a low level in the level 1 and the level 2, the level 2 being a low level in the level 2 and the level 3, and so on. For example, if the threshold value 1<the threshold value 2<the threshold value 3<the threshold value 4, when all the movement speeds are less than the foregoing four threshold values, the threshold value 1 is determined as the target speed threshold value, and the target speed level is level 1. When the movement speed is greater than the threshold value 1 and less than the threshold value 2, the threshold value 2 is determined as the target speed threshold value, and the target speed level is level 2. It should be noted that the target speed level is level 5 when all the movement speeds are greater than the foregoing four threshold values.

For the target speed threshold value being the maximum threshold value of the movement speed threshold values less than the movement speed, a high level corresponding to the target speed threshold value may be used as a target speed level, such as the level 2 being a high level in the level 1 and the level 2, the level 3 being a high level in the level 2 and the level 3, and so on. For example, if the threshold value 1<the threshold value 2<the threshold value 3<the threshold value 4, when all the movement speeds are greater than the foregoing four threshold values, the threshold value 4 is determined as the target speed threshold value, and the target speed level is level 5. When the movement speed is greater than the threshold value 3 and less than the threshold value 4, the threshold value 3 is determined as the target speed threshold value, and the target speed level is level 4. It should be noted that the target speed level is level 1 when all the movement speeds are less than the foregoing four threshold values.

Manner II: Because the preset speed level represents a speed range of the movement speed, the terminal may determine a speed range corresponding to which preset speed level within which the movement speed of the terminal falls, thereby determining that the preset speed level corresponding to the speed range is the target speed level.

It should be noted that, in Manner I, the terminal does not learn the speed level defined by the network side device, and the preset speed level defined by the network side device can only be determined using the movement speed threshold value sent by the network side device. In Manner II, both the network side device and the terminal learn the preset speed level, in this way, the terminal may determine which preset speed level corresponding to the terminal according to its speed without requiring the network side device to send the movement speed threshold value.

Manner III: The terminal obtains a number of cells on which the terminal camps within a first preset time period, determines a target number threshold value from threshold values of the number of cells to be camped on, and determines the target speed level according to the target number threshold value. Different threshold values of the number of cells to be camped on correspond to different preset speed levels. The target number threshold value is a minimum threshold value of the target number threshold values greater than the number of cells, or the target number threshold value is a maximum threshold value of the target number threshold values less than the number of cells.

It should be noted that the target number threshold value is determined from the threshold values of the number of cells to be camped on, and the target speed level is determined according to the target number threshold value. For the foregoing descriptions, reference may be made to the foregoing Manner I in which the target speed threshold value is determined from the movement speed threshold values, and the target speed level is determined according to the target speed threshold value, and details are not described herein again.

S405. The terminal obtains a corrected power threshold corresponding to a difference value between the target speed level and the first speed level.

For example, if the preset speed level includes level 1, level 2, level 3, level 4, and level 5, the level 1 differs from the level 2 by one level, and a difference value between the level 1 and the level 2 is 1. The level 1 differs from the level 3 by 2 levels, and a difference value between the level 1 and the level 2 is 1, and so on. A difference value between every two speed levels may be determined.

In this step, corrected power may be obtained in the following two manners:

Manner I: Corrected power thresholds corresponding to a plurality of preset level difference values sent by the network side device is received, and a corrected power threshold corresponding to a difference value between the target speed level and the first speed level is determined from the corrected threshold power values corresponding to the preset level difference.

Manner II: The terminal determines a corrected threshold power value corresponding to a difference value between the target speed level and the first speed level from the corrected threshold power values corresponding to the plurality of preset level differences configured by the terminal.

S406. The terminal adds the corrected threshold power value and the power threshold for enabling cell reselection measurement to get the target power threshold.

It should be noted that the foregoing corrected power may be a positive value, or may be a negative value. For example, a higher power threshold for enabling cell reselection measurement results in enabling cell reselection measurement earlier. Therefore, if the power threshold for enabling cell reselection measurement is configured according to a low speed level, for a terminal with a high speed level, a positive corrected threshold power value is required to be superimposed on the power threshold for enabling cell reselection measurement, so as to increase the power threshold for enabling cell reselection measurement, and trigger cell reselection earlier. On the contrary, if the power threshold for enabling cell reselection measurement is configured according to a high speed level, for a terminal with a low speed level, a negative corrected threshold power value is required to be superimposed on the power threshold for enabling cell reselection measurement, so as to reduce the power threshold for enabling cell reselection measurement, and avoid triggering cell reselection earlier.

S407. The terminal obtains a first received power measurement value of a downlink reference signal received in a cell to be camped on.

S408. The terminal determines whether the first received power measurement value is less than the target power threshold.

S409. The terminal determines to enable the cell reselection measurement when the first received power measurement value is less than the target power threshold.

It should be noted that, an excessively high target power threshold results in frequent cell reselection performed by the terminal between two cells. In order to resolve the problem, in another embodiment of the present disclosure, after the cell reselection measurement is determined, the terminal may further obtain a second received power measurement value of the downlink reference signal in a neighboring cell of the cell to be camped on, determines whether second received power measurement values in all neighboring cells are less than the first received power measurement value, stop cell reselection measurement when the second received power measurement values in all the neighboring cell are less than the first received power measurement value within the second preset time period, subtracts a preset corrected power value from the target power threshold to get a new target power threshold, uses the new target power threshold as the power threshold for enabling cell reselection measurement corresponding to the target speed level, re-obtains the movement speed and the first received power measurement value of the terminal, and determines, according to the re-obtained movement speed, the re-obtained first received power measurement value, and the new target power threshold, whether to re-enable the cell reselection measurement.

In this way, when it is determined, according to the first received power measurement value and the second received power measurement value, that cell reselection does not need to be performed for the cell to be camped on, the target power threshold may be reduced, and a frequency of enabling the cell reselection measurement may be reduced.

Accordingly, when the second received power measurement value in the target cell is less than the first received power measurement value within the second preset time period, the target cell is determined as a cell to be camped on of the terminal.

The target cell is any neighboring cell of all the neighboring cells.

In the foregoing solutions, the terminal may determine a target power threshold according to the movement speed of the terminal and the threshold information for enabling cell reselection measurement sent by the network side device, so that it can be flexibly determined, according to the power threshold for enabling cell reselection measurement corresponding to the movement speed, whether to perform cell reselection measurement, and the NB-IoT terminal with a low speed or in a static state is prevented from frequently enabling the cell reselection measurement, thereby reducing power consumption of the terminal.

It should be noted that, for brevity of description, the foregoing method embodiments are described as a series of movement combinations. However, a person skilled in the art should understand that the present disclosure is not limited by the movement sequence. In addition, a person skilled in the art should also understand that the embodiments described in this specification all belong to exemplary embodiments, and the involved actions and modules are not necessarily mandatory to the present disclosure.

Figure 5:
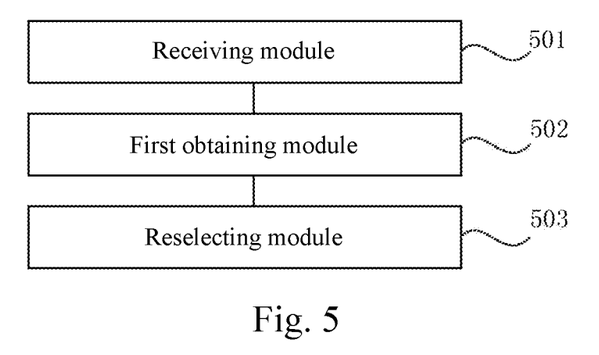
FIG. 5 is a schematic structural diagram of an apparatus for cell reselection according to an embodiment of the present disclosure.

FIG. 5 is an apparatus for cell reselection provided according to an embodiment of the present disclosure. As shown in FIG. 5, the apparatus is applied to a terminal, including:

a receiving module 501, configured to receive threshold information for enabling cell reselection sent by a network side device, the threshold information for enabling cell reselection measurement including at least one power threshold for enabling cell reselection measurement and corresponding preset speed range information, the preset speed range information being used to indicate a movement speed range of a preset terminal;

a first obtaining module 502, configured to obtain the movement speed of the terminal and a first received power measurement value of a downlink reference signal received by the terminal in a cell to be camped on; and a reselecting module 503, configured to determine, according to the movement speed, the threshold information for enabling cell reselection measurement, and the first received power measurement value, whether to enable the cell reselection measurement.

Figure 6:
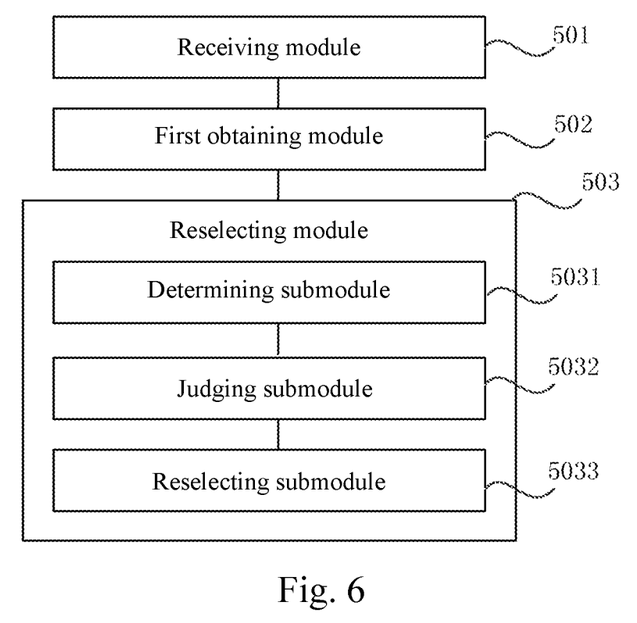
FIG. 6 is a schematic structural diagram of another apparatus for cell reselection according to an embodiment of the present disclosure.

Optionally, as shown in FIG. 6, the reselecting module 503 includes:

a determining submodule 5031, configured to determine a target power threshold according to the movement speed and the threshold information for enabling cell reselection measurement;

a judging submodule 5032, configured to determine whether a first received power measurement value is less than the target power threshold; and a reselecting submodule 5033, configured to determine to enable the cell reselection measurement when the first received power measurement value is less than the target power threshold.

Optionally, the preset speed range information includes a preset speed level, and different preset speed levels indicate different preset speed ranges. The determining submodule 5031 is configured to: determine a target speed level corresponding to the movement speed in a plurality of preset speed levels when there are a plurality of power thresholds for enabling cell reselection measurement, and determine the target power threshold corresponding to the target speed level from the power thresholds for enabling cell reselection measurement.

Optionally, the preset speed range information includes the preset speed level, and different preset speed levels indicate different preset speed ranges. The determining submodule 5031 is configured to: determine a first speed level corresponding to the power threshold for enabling cell reselection measurement when there is one power threshold for enabling cell reselection measurement; determine the target speed level corresponding to the movement speed in the plurality of preset speed levels; obtain a corrected threshold power value corresponding to a difference value between the target speed level and the first speed level; and add the corrected power threshold and the power threshold for enabling cell reselection measurement to get the target power threshold.

Optionally, the determining submodule 5031 is configured to: receive movement speed threshold values that are sent by the network side device and correspond to the plurality of preset speed levels; determine a target speed threshold value from the movement speed threshold values; determine the target speed level according to the target speed threshold value, different movement speed threshold values corresponding to different preset speed levels. The target speed threshold value is a minimum threshold value of the movement speed threshold values greater than the movement speed, or the target speed threshold value is a maximum threshold value of the movement speed threshold values less than the movement speed.

Optionally, the determining submodule 5031 is configured to obtain a number of cells on which the terminal camps within a first preset time period; determine a target number threshold value from a threshold value of the number of cells to be camped on, and determine the target speed level according to the target number threshold values, different threshold values of the number of cells to be camped on corresponding to different preset speed levels. The threshold value of the target number is a minimum threshold value of the target number threshold values greater than the number of cells, or the target number threshold value is a maximum threshold value of the target number threshold values less than the number of cells.

Figure 7:
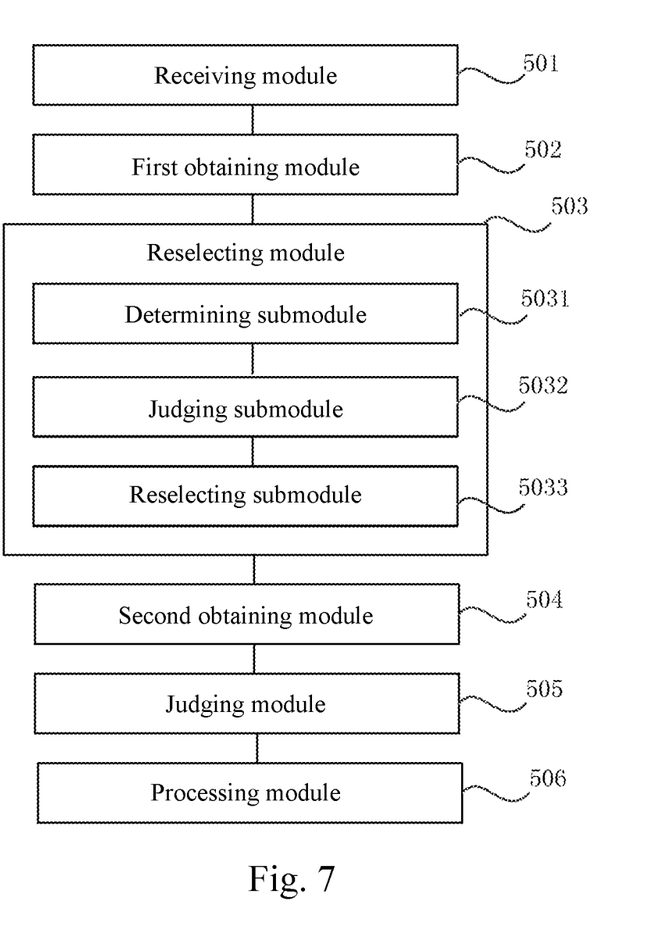
FIG. 7 is a schematic structural diagram of a third apparatus for cell reselection according to an embodiment of the present disclosure.

Optionally, as shown in FIG. 7, the apparatus further includes:

a second obtaining module 504, configured to obtain a second received power measurement value of a downlink reference signal received by the terminal in a neighboring cell of a cell to be camped on;

a judging module 505, configured to determine whether second received power measurement values in all neighboring cells are less than the first received power measurement value within a second preset time period; and a processing module 506, configured to stop cell reselection measurement when the second received power measurement values in all the neighboring cells are less than the first received power measurement value within the second preset time period, subtract a preset corrected power value from the target power threshold to get a new target power threshold, use the new target power threshold as the power threshold for enabling cell reselection measurement corresponding to the target speed level, re-obtain the movement speed and the first received power measurement value of the terminal, and determine, according to the re-obtained movement speed, the re-obtained first received power measurement value, and the new target power threshold, whether to re-enable cell reselection measurement.

Optionally, the processing module is configured to obtain a number of cells on which the terminal camps within the first preset time period, determine a target number threshold value from threshold values of the number of cells to be camped on, and determine the target speed level according to the threshold values of the target number, different threshold values of the number of cells to be camped on corresponding to different preset speed levels. The target number threshold value is a minimum threshold value of the target number threshold values greater than the number of cells, or the target number threshold value is a maximum threshold value of the target number threshold values less than the number of cells.

In the foregoing solutions, the terminal may determine a target power threshold according to the movement speed of the terminal and the threshold information for enabling cell reselection measurement sent by the network side device, so that it can be flexibly determined, according to the power threshold for enabling cell reselection measurement corresponding to the movement speed, whether to perform cell reselection measurement, and the NB-IoT terminal with a low speed or in a static state is prevented from frequently enabling the cell reselection measurement, thereby reducing power consumption of the terminal.

Figure 8:
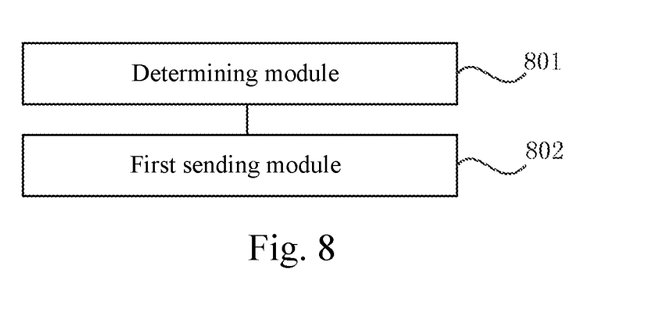
FIG. 8 is a schematic structural diagram of a fourth apparatus for cell reselection according to an embodiment of the present disclosure.

FIG. 8 is an apparatus for cell reselection provided according to an embodiment of the present disclosure. As shown in FIG. 8, the apparatus is applied to a network side device, including:

a determining module 801, configured to determine threshold information for enabling cell reselection, the threshold information for enabling cell reselection measurement including at least one power threshold for enabling cell reselection measurement and corresponding preset speed range information, and the preset speed range information being used to indicate a movement speed range of a preset terminal; and a first sending module 802, configured to send the threshold information for enabling cell reselection measurement to the terminal, so that the terminal determines, according to the movement speed, the threshold information for enabling cell reselection measurement, and the first received power measurement value of the downlink reference signal received in the cell to be camped on, whether to enable the cell reselection measurement.

Figure 9:
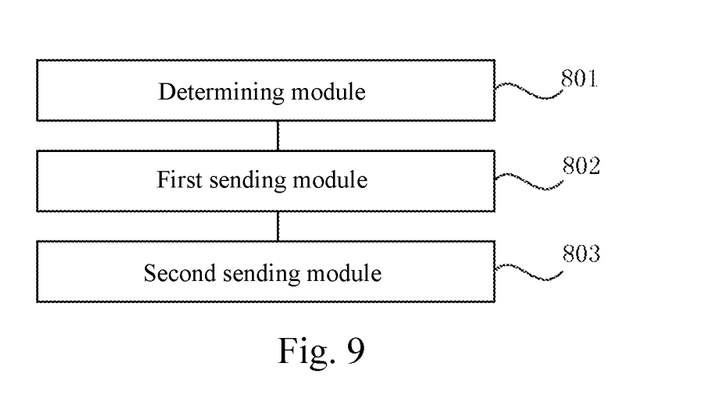
FIG. 9 is a schematic structural diagram of a fifth apparatus for cell reselection according to an embodiment of the present disclosure.

Optionally, as shown in FIG. 9, the apparatus further includes:

a second sending module 803, configured to send a movement speed threshold value to the terminal, the movement speed threshold value corresponding to a preset speed level, and different preset speed levels corresponding to different preset speed ranges, so that the terminal determines a target speed level corresponding to the movement speed of the terminal according to the movement speed threshold value.

With the foregoing apparatus, the network side device may send the configured threshold information for enabling cell reselection measurement to the terminal, and the terminal may determine the target power threshold according to the movement speed of the terminal and the threshold information for enabling cell reselection measurement, so that a power threshold is flexibly selected to perform cell reselection measurement, and an NB-IoT terminal with a low speed or in a static state is prevented from frequently enabling cell reselection measurement, thereby reducing power consumption of the terminal.

Figure 10:
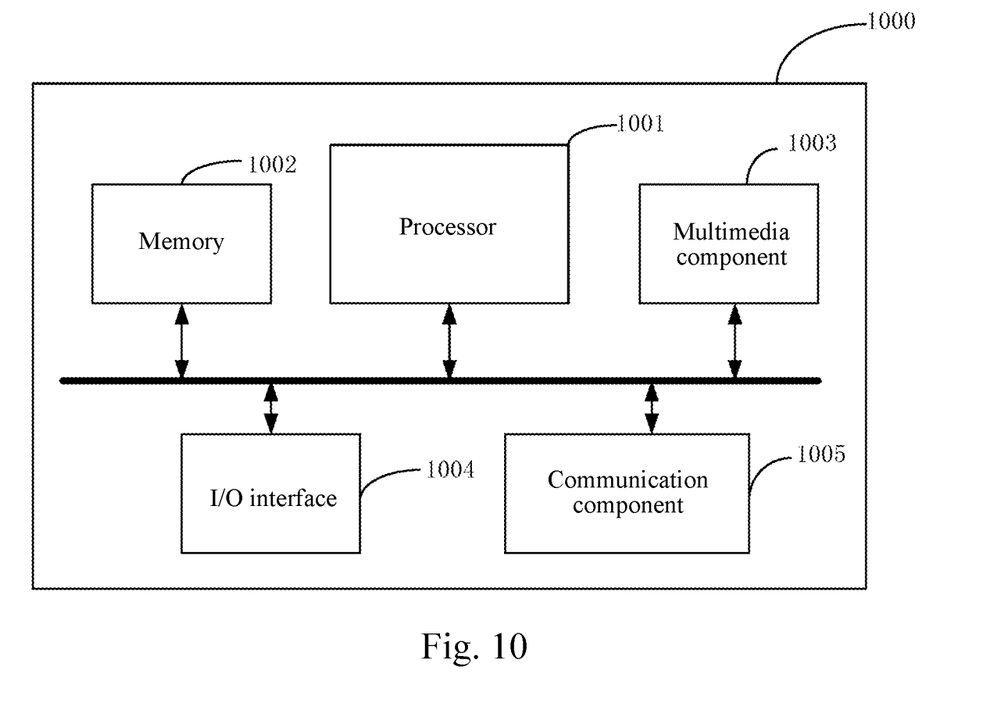
FIG. 10 is a schematic structural diagram of hardware an apparatus for cell reselection according to an embodiment of the present disclosure.

FIG. 10 is a block diagram of an apparatus for cell reselection according to an embodiment of the present disclosure. As shown in FIG. 10, the apparatus may be applied to a network side device or a terminal. The apparatus 1000 may include: a processor 1001, a memory 1002, a multimedia component 1003, an input/output (I/O) interface 1004, and a communication component 1005.

The processor 1001 is configured to control overall operation of the apparatus 1000 to complete all or some steps of the foregoing method for cell reselection. The memory 1002 is configured to store various types of data to support operations on the apparatus 1000. Such data may include, for example, an instruction for any application or method operated on the apparatus 1000, and application-related data, such as contact data, sent and received messages, pictures, audio, and video, etc.

The memory 1002 may be implemented by any type of volatile or non-volatile storage terminal device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a disk, or an optical disk. The multimedia component 1003 may include a screen and an audio component. The screen may be, for example, a touch screen, and the audio component is configured to output and/or input an audio signal. For example, the audio component may include a microphone for receiving an external audio signal. The received audio signal may be further stored in the memory 1002 or be sent via the communication component 1005. The audio component further includes at least one speaker for outputting the audio signal. The I/O interface 1004 provides an interface between the processor 1001 and other interface modules. The foregoing other interface modules may be a keyboard, a mouse, and a button, etc. These buttons may be virtual buttons or physical buttons. The communication component 1005 is configured to perform wired or wireless communication between the apparatus 1000 and other terminal devices. Wireless communication includes, for example, Wi-Fi, Bluetooth, near field communication (NFC), 2G, 3G, or 4G, or a combination of one or more thereof. Therefore, the respective communication components 1005 may include a Wi-Fi module, a Bluetooth module, and an NFC module.

In an exemplary embodiment, the apparatus 1000 may be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor, or other electronic elements, configured to perform the foregoing method for cell reselection.

An embodiment of the present disclosure further provides a non-transitory computer readable storage medium 1. The non-transitory computer readable storage medium 1 includes one or more programs for performing a method for cell reselection. The method includes: receiving threshold information for enabling cell reselection measurement sent by a network side device, the threshold information for enabling cell reselection measurement including at least one power threshold for enabling cell reselection measurement and corresponding preset speed range information, and the preset speed range information being used to indicate a movement speed range of a preset terminal; obtaining a movement speed of the terminal and a first received power measurement value of a downlink reference signal received by the terminal in a cell to be camped on; determining, according to the movement speed, the threshold information for enabling cell reselection measurement, and the first received power measurement value, whether to enable the cell reselection measurement.

Optionally, the determining, according to the movement speed, the threshold information for enabling cell reselection, and the first received power measurement value, whether to enable the cell reselection measurement includes: determining a target power threshold according to the movement speed and the threshold information for enabling cell reselection measurement; determining whether the first received power value is less than the target power threshold; and determining to enable the cell reselection measurement when the first received power measurement value is less than the target power threshold.

Optionally, the preset speed range information includes a preset speed level, and different preset speed levels indicate different preset speed ranges. When there are a plurality of power thresholds for enabling cell reselection measurement, the determining the target power threshold according to the movement speed and the threshold information for enabling cell reselection measurement includes: determining a target speed level corresponding to the movement speed in a plurality of preset speed levels; and determining a target power threshold corresponding to the target speed level from the power threshold for enabling cell reselection measurement.

Optionally, the preset speed range information includes the preset speed level, and different preset speed levels indicate different preset speed ranges. When there is one power threshold for enabling cell reselection measurement, the determining the target power threshold according to the movement speed and the power threshold for enabling cell reselection measurement includes: determining a first speed level corresponding to the power threshold for enabling cell reselection measurement; determining a target speed level corresponding to the movement speed in a plurality of preset speed levels; obtaining a corrected threshold power value corresponding to a difference value between the target speed level and the first speed level; and adding the corrected power threshold and the power threshold for enabling cell reselection measurement to get the target power threshold.

Optionally, the determining the target speed level of the movement speed in the plurality of preset speed levels includes: receiving movement speed threshold values that are sent by the network side device and correspond to the plurality of preset speed levels; and determining a target speed threshold value from the movement speed threshold values, different movement speed threshold values corresponding to different preset speed levels. The target speed threshold value is a minimum threshold value of the movement speed threshold values greater than the movement speed, or the target speed threshold value is a maximum threshold value of the movement speed threshold values less than the movement speed.

Optionally, the determining the target speed level corresponding to the movement speed in the plurality of preset speed levels includes: obtaining a number of cells on which the terminal camps within the first preset time period; and determining the target number threshold value from threshold values of the number of cells to be camped on, different threshold values of the number of cells to be camped on corresponding to different preset speed levels. The target number threshold value is a minimum threshold value of the target number threshold values greater than the number of cells, or the target number threshold value is a maximum threshold value of the target number threshold values less than the number of cells.

Optionally, after the terminal enables the cell reselection measurement, the determining the target speed level corresponding to the movement speed in the plurality of preset speed levels further includes: obtaining a second received power measurement value of a downlink reference signal received by the terminal in a neighboring cell of the cell to be camped on; determining whether second received power measurement values in all neighboring cells are less than the first received power measurement values within a second preset time period; stopping cell reselection measurement when the second received power measurement values in all the neighboring cell are less than the first received power measurement value within the second preset time period, subtracting a preset corrected power from the target power threshold to get a new target power threshold, using the new target power threshold as the power threshold for enabling cell reselection measurement corresponding to the target speed level, re-obtaining the movement speed and the first received power measurement value of the terminal, and determining, according to the re-obtained movement speed, the re-obtained first received power measurement value, and the new target power threshold, whether to re-enable the cell reselection measurement.

Optionally, when the second received power measurement value in a target cell is less than the first received power measurement value within the second preset time period, the target cell is determined as a cell to be camped on of the terminal, the target cell being any neighboring cell of all the neighboring cells.

A terminal 2 is further provided according to an embodiment of the present disclosure, the terminal 2 including:

the foregoing non-transitory computer readable storage medium 1; and one or more processors for executing a program in the foregoing non-transitory computer readable storage medium 1.

An embodiment of the present disclosure further provides a non-transitory computer readable storage medium 3, the non-transitory computer readable storage medium 3 including one or more programs for performing a method for cell reselection. The method includes: determining threshold information for enabling cell reselection measurement, the threshold information for enabling the cell reselection measurement including at least one power threshold for enabling cell reselection measurement and corresponding preset speed range information, and the preset speed range information being used to indicate a movement speed range of a preset terminal; sending the threshold information for enabling cell reselection measurement to the terminal, so that the terminal determines, according to the movement speed, the threshold information for enabling the cell reselection measurement, and the first received power measurement value of the downlink reference signal received in the cell to be camped on, whether to enable the cell reselection measurement.

Optionally, after determining the threshold information for enabling cell reselection measurement, the method further includes: sending a movement speed threshold value to the terminal, the movement speed threshold value corresponding to a preset speed level, and different preset speed levels corresponding to different preset speed ranges, so that the terminal determines, according to the movement speed threshold value, a target speed level corresponding to the movement speed of the terminal.

A network side device 4 is further provided in an embodiment of the present disclosure, the network side device 4 including:

the foregoing non-transitory computer readable storage medium 3; and one or more processors for executing a program in the foregoing non-transitory computer readable storage medium 3.

Although preferred implementations of this disclosure are described in detail above with reference to the accompanying drawings, this disclosure is not limited to specific details in the foregoing implementations. Various simple variations can be made to the technical solutions of this disclosure within the scope of the technical idea of the present invention, and such simple variations all fall within the protection scope of this disclosure.

It should be further noted that the specific technical features described in the foregoing specific implementations can be combined in any appropriate manner provided that no conflict occurs. To avoid unnecessary repetition, various possible combination manners will not be described in the present invention.

In addition, various different implementations of this disclosure may alternatively be combined randomly. Such combinations should also be considered as the content disclosed in this disclosure provided that these combinations do not depart from the concept of this disclosure.

What is claimed is:

1. A method for cell reselection, applied to a terminal, comprising:
receiving threshold information for enabling cell reselection measurement sent by a network side device, the threshold information for enabling cell reselection measurement comprising at least one power threshold for enabling cell reselection measurement and corresponding preset speed range information, the preset speed range information being used to indicate a movement speed range of a preset terminal;
obtaining a movement speed of the terminal and a first received power measurement value of a downlink reference signal received by the terminal in a cell to be camped on; and
determining, according to the movement speed, the threshold information for enabling cell reselection measurement, and the first received power measurement value, whether to enable the cell reselection measurement,
wherein the determining, according to the movement speed, the threshold information for enabling cell reselection measurement, and the first received power measurement value, whether to enable the cell reselection measurement comprises:
determining a target power threshold according to the movement speed and the threshold information for enabling cell reselection measurement;
determining whether the first received power measurement value is less than the target power threshold; and
determining to enable the cell reselection measurement when the first received power measurement value is less than the target power threshold.

2. The method according to claim 1, wherein the preset speed range information comprises a preset speed level, different preset speed levels representing different preset speed ranges, and when there are a plurality of power thresholds for enabling cell reselection, the determining the target power threshold according to the movement speed and the threshold information for enabling cell reselection comprises:
determining a target speed level corresponding to the movement speed in a plurality of preset speed levels; and
determining the target power threshold corresponding to the target speed level from the power threshold for enabling cell reselection measurement.

3. The method according to claim 2, wherein the determining a target speed level corresponding to the movement speed in a plurality of preset speed levels comprises:
receiving movement speed threshold values that is sent by a network side device and corresponds to the plurality of preset speed levels;
determining a target speed threshold value from the movement speed threshold values, wherein different movement speed threshold values correspond to different preset speed levels, the target speed threshold value being a minimum threshold value of the movement speed threshold values that are greater than the movement speed, or the target speed threshold value being a maximum threshold value of the movement speed threshold values of the movement speed that are less than the movement speed; and
determining the target speed level according to the target speed threshold value.

4. The method according to claim 2, wherein the determining a target speed level corresponding to the movement speed in a plurality of preset speed levels comprises:
obtaining a number of cells on which a terminal camps within a first preset time period;
determining a target number threshold value from threshold values of the number of cells to be camped on, wherein different threshold values of the number of cells to be camped on correspond to different preset speed levels, the target number threshold value being a minimum threshold value of the target number threshold values greater than the number of cells, or the target number threshold value being a maximum threshold value of the target number threshold values less than the number of cells; and
determining the target speed level according to the target number threshold value.

5. The method according to claim 1, wherein the preset speed range information comprises a preset speed level, different preset speed levels representing different preset speed ranges, and when there is one power threshold for enabling cell reselection, the determining the target power threshold according to the movement speed and the power threshold for enabling cell reselection measurement comprises:
determining a first speed level corresponding to the power threshold for enabling cell reselection measurement;
determining a target speed level corresponding to the movement speed in a plurality of preset speed levels;
obtaining a corrected power threshold corresponding to a difference value between the target speed level and the first speed level; and
adding the corrected power threshold and the power threshold for enabling cell reselection measurement to get the target power threshold.

6. The method according to claim 1, wherein after enabling the cell reselection measurement at the terminal, the method further comprises:
obtaining a second received power measurement value of a downlink reference signal received by the terminal in a neighboring cell of a cell to be camped on;
determining whether second received power measurement values in all neighboring cells are less than the first received power measurement value within a second preset time period;
when the second received power measurement values in all the neighboring cells are less than the first received power measurement value within the second preset time period, stopping cell reselection measurement, subtracting a preset corrected power value from the target power threshold to get a new target power threshold, using the new target power threshold as the power threshold for enabling cell reselection measurement corresponding to the target speed level, re-obtaining the movement speed and the first received power measurement value of the terminal, and determining whether to re-enable cell reselection measurement according to a re-obtained movement speed, a re-obtained first received power measurement value, and the new target power threshold.

7. The method according to claim 6, further comprising: when the second received power measurement value of a target cell is less than the first received power measurement value within the second preset time period, determining the target cell as a cell to be camped on of the terminal, wherein the target cell is any neighboring cell of all the neighboring cells.

8. A non-transitory computer readable storage medium having computer readable instructions which, when executed by one or more processors, cause the one or more processors to:
receive threshold information for enabling cell reselection measurement sent by a network side device, the threshold information for enabling cell reselection measurement comprising at least one power threshold for enabling cell reselection measurement and corresponding preset speed range information, the preset speed range information being used to indicate a movement speed range of a preset terminal;
obtain a movement speed of the terminal and a first received power measurement value of a downlink reference signal received by the terminal in a cell to be camped on; and
determine, according to the movement speed, the threshold information for enabling cell reselection measurement, and the first received power measurement value, whether to enable the cell reselection measurement,
wherein to determine, according to the movement speed, the threshold information for enabling cell reselection measurement, and the first received power measurement value, whether to enable the cell reselection measurement, the computer readable instructions cause the one or more processors to:
determine a target power threshold according to the movement speed and the threshold information for enabling cell reselection measurement;
determine whether the first received power measurement value is less than the target power threshold; and
determine to enable the cell reselection measurement when the first received power measurement value is less than the target power threshold.

9. The non-transitory computer readable storage medium according to claim 8, wherein the preset speed range information comprises a preset speed level, different preset speed levels representing different preset speed ranges;
wherein when there is a plurality of power thresholds for enabling cell reselection, to determine the target power threshold according to the movement speed and the threshold information for enabling cell reselection, the computer readable instructions cause the one or more processors to:
determine a target speed level corresponding to the movement speed in a plurality of preset speed levels;
determine the target power threshold corresponding to the target speed level from the power threshold for enabling cell reselection measurement.

10. The non-transitory computer readable storage medium according to claim 8, wherein the preset speed range information comprises a preset speed level, different preset speed levels representing different preset speed ranges;
wherein when there is one power threshold for enabling cell reselection, to determine the target power threshold according to the movement speed and the power threshold for enabling cell reselection measurement, the computer readable instructions cause the one or more processors to:
determine a first speed level corresponding to the power threshold for enabling cell reselection measurement;
determine a target speed level corresponding to the movement speed in a plurality of preset speed levels;
obtain a corrected power threshold corresponding to a difference value between the target speed level and the first speed level; and
add the corrected power threshold and the power threshold for enabling cell reselection measurement to get the target power threshold.

11. The non-transitory computer readable storage medium according to claim 8, wherein after the cell reselection measurement at the terminal is enabled, the computer readable instructions cause the one or more processors to:
obtain a second received power measurement value of a downlink reference signal received by the terminal in a neighboring cell of a cell to be camped on;
determine whether second received power measurement values in all neighboring cells are less than the first received power measurement value within a second preset time period;
when the second received power measurement values in all the neighboring cells are less than the first received power measurement value within the second preset time period, stop cell reselection measurement, subtract a preset corrected power value from the target power threshold to get a new target power threshold, use the new target power threshold as the power threshold for enabling cell reselection measurement corresponding to the target speed level, re-obtain the movement speed and the first received power measurement value of the terminal, and determine whether to re-enable cell reselection measurement according to a re-obtained movement speed, a re-obtained first received power measurement value, and the new target power threshold.

12. A terminal, comprising:
one or more processors;
a non-transitory computer readable storage medium having computer readable instructions which, when executed by one or more processors, cause the one or more processors to:
receive threshold information for enabling cell reselection measurement sent by a network side device, the threshold information for enabling cell reselection measurement comprising at least one power threshold for enabling cell reselection measurement and corresponding preset speed range information, the preset speed range information being used to indicate a movement speed range of a preset terminal;
obtain a movement speed of the terminal and a first received power measurement value of a downlink reference signal received by the terminal in a cell to be camped on; and
determine, according to the movement speed, the threshold information for enabling cell reselection measurement, and the first received power measurement value, whether to enable the cell reselection measurement,
wherein to determine, according to the movement speed, the threshold information for enabling cell reselection measurement, and the first received power measurement value, whether to enable the cell reselection measurement, the computer readable instructions cause the one or more processors to:
determine a target power threshold according to the movement speed and the threshold information for enabling cell reselection measurement;
determine whether the first received power measurement value is less than the target power threshold; and
determine to enable the cell reselection measurement when the first received power measurement value is less than the target power threshold.

13. The terminal according to claim 12, wherein the preset speed range information comprises a preset speed level, different preset speed levels representing different preset speed ranges;
- wherein when there is a plurality of power thresholds for enabling cell reselection, to determine the target power threshold according to the movement speed and the threshold information for enabling cell reselection, the computer readable instructions cause the one or more processors to:
- determine a target speed level corresponding to the movement speed in a plurality of preset speed levels; and
- determine the target power threshold corresponding to the target speed level from the power threshold for enabling cell reselection measurement.

14. The terminal according to claim 13, wherein to determine a target speed level corresponding to the movement speed in a plurality of preset speed levels, the computer readable instructions cause the one or more processors to:
- receive movement speed threshold values that is sent by a network side device and corresponds to the plurality of preset speed levels;
- determine a target speed threshold value from the movement speed threshold values, wherein different movement speed threshold values correspond to different preset speed levels, the target speed threshold value being a minimum threshold value of the movement speed threshold values that are greater than the movement speed, or the target speed threshold value being a maximum threshold value of the movement speed threshold values of the movement speed that are less than the movement speed; and
- determine the target speed level according to the target speed threshold value.

15. The terminal according to claim 13, wherein to determine a target speed level corresponding to the movement speed in a plurality of preset speed levels, the computer readable instructions cause the one or more processors to:
- obtain a number of cells on which a terminal camps within a first preset time period;
- determine a target number threshold value from threshold values of the number of cells to be camped on, wherein different threshold values of the number of cells to be camped on correspond to different preset speed levels, the target number threshold value being a minimum threshold value of the target number threshold values greater than the number of cells, or the target number threshold value being a maximum threshold value of the target number threshold values less than the number of cells; and
- determine the target speed level according to the target number threshold value.

16. The terminal according to claim 12, wherein the preset speed range information comprises a preset speed level, different preset speed levels representing different preset speed ranges;
- wherein when there is one power threshold for enabling cell reselection, to determine the target power threshold according to the movement speed and the power threshold for enabling cell reselection measurement, the computer readable instructions cause the one or more processors to:
- determine a first speed level corresponding to the power threshold for enabling cell reselection measurement;
- determine a target speed level corresponding to the movement speed in a plurality of preset speed levels;
- obtain a corrected power threshold corresponding to a difference value between the target speed level and the first speed level; and
- add the corrected power threshold and the power threshold for enabling cell reselection measurement to get the target power threshold.

17. The terminal according to claim 12, wherein after the cell reselection measurement at the terminal is enabled, the computer readable instructions cause the one or more processors to:
- obtain a second received power measurement value of a downlink reference signal received by the terminal in a neighboring cell of a cell to be camped on;
- determine whether second received power measurement values in all neighboring cells are less than the first received power measurement value within a second preset time period;
- when the second received power measurement values in all the neighboring cells are less than the first received power measurement value within the second preset time period, stop cell reselection measurement, subtracting a preset corrected power value from the target power threshold to get a new target power threshold, use the new target power threshold as the power threshold for enabling cell reselection measurement corresponding to the target speed level, re-obtain the movement speed and the first received power measurement value of the terminal, and determine whether to re-enable cell reselection measurement according to a re-obtained movement speed, a re-obtained first received power measurement value, and the new target power threshold.

* * * * *